Oct. 28, 1924.

G. M. WINGARD

SHAFT COUPLING

Filed May 6, 1922

Inventor
George M. Wingard
By
Mann & Co.
Attorneys

Oct. 28, 1924.
G. M. WINGARD
1,512,966
SHAFT COUPLING
Filed May 6, 1922
2 Sheets-Sheet 2
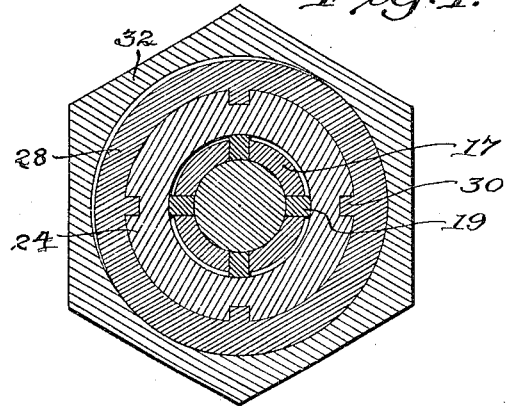
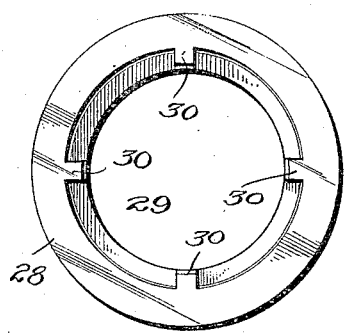
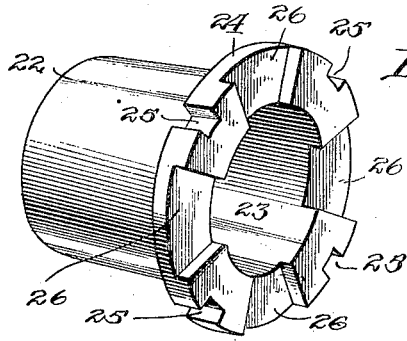
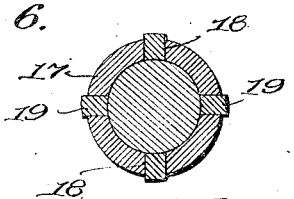
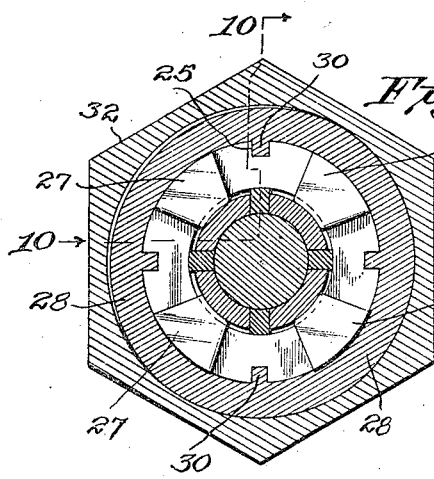
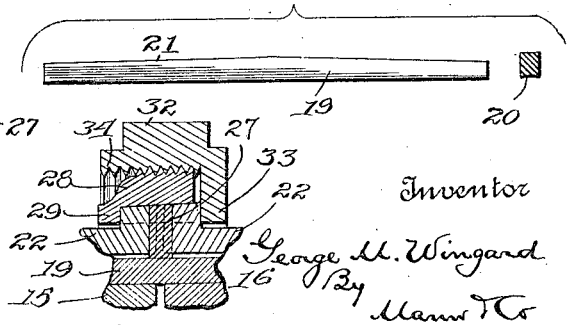

Patented Oct. 28, 1924.

1,512,966

UNITED STATES PATENT OFFICE.

GEORGE M. WINGARD, OF OXFORD, MARYLAND.

SHAFT COUPLING.

Application filed May 6, 1922. Serial No. 558,849.

*To all whom it may concern:*

Be it known that GEORGE M. WINGARD, a citizen of the United States, residing at Oxford, in the county of Talbot and State of Maryland, has invented certain new and useful Improvements in Shaft Couplings, of which the following is a specification.

This invention relates to improvements in shaft-couplings and has for its object to provide an improved construction of coupling for rigidly uniting the adjacent ends of two shafts or pipes.

The invention consists in the novel construction, combination and arrangement of parts hereinafter described and more particularly pointed out in the appended claims.

The accompanying drawings illustrate the invention wherein,—

Fig. 4 illustrates a cross-sectional detail through the coupled parts as the same would appear if cut on the line 4—4 of Fig. 1.

Fig. 5 shows the detached locking collar in end view, as the same would appear if viewed on the line 5—5 of Fig. 2.

Fig. 6 illustrates one of the coupling heads in perspective.

Fig. 7 shows a cross-sectional detail through the coupling sleeve, one of the shaft-ends and the shaft-engaging bars, the section being taken on the line 7—7 of Fig. 2.

Fig. 8 illustrates one of the detached shaft-engaging bars or keys, the figure including a side elevation and a cross-sectional detail of the bar or key.

Fig. 9 shows a cross-sectional detail through the coupling parts as the same would appear if viewed on the line 9—9 of Fig. 3, and Fig. 10 illustrates a sectional detail through the coupling, the section being taken on the line 10—10 of Fig. 9.

Figure 1:
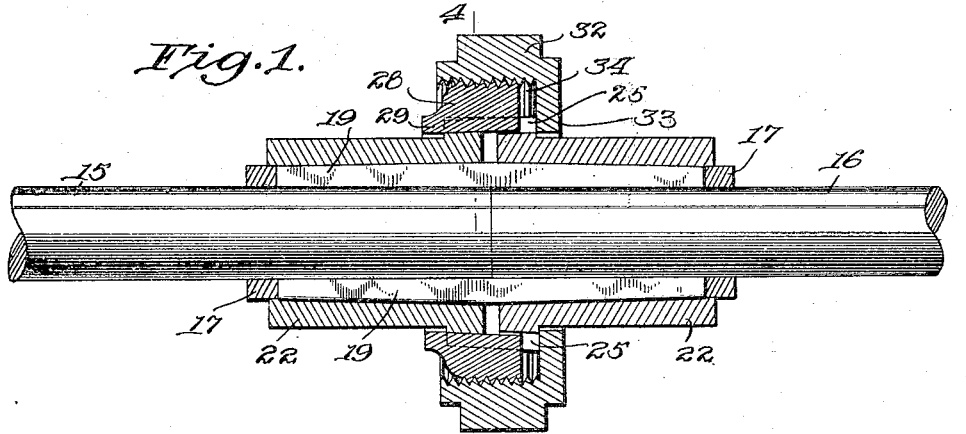
Fig. 1 shows in longitudinal section, the improved coupling assembled and locking two shaft-ends together.

Referring to the drawings the numeral 15, designates one shaft or tube-end while 16 designates the end of another shaft or tube which two ends are to be rigidly connected.

On the two shaft-ends I place a coupling sleeve 17 so that the two ends enter this sleeve from opposite ends of the latter.

The coupling sleeve is provided with a series of longitudinal slots 18 which slots are of less length than the sleeve and extend all the way through the sleeve from the outer to the inner circumference thereof.

The inner and outer circumferences of the sleeve 17 are both preferably uniform from end to end.

In each of the slots 18, I provide a key-bar 19 which bars have a slightly concave inner face 20 and are provided with an outer face 21 which is slightly tapered in a lengthwise direction from opposite ends toward the center of the bars, the bars being thicker or higher at the center than at either end thereof for a purpose that will presently be explained.

Obviously, when the sleeve 17 is in place on the ends of two shafts and the key-bars are inserted in the slots 18 of the sleeve, the concave inner faces of the bars will seat against the circumference of the shaft-ends, as clearly shown in Fig. 7, of the drawing.

On each end of the sleeve 17 I slide a coupling head 22 and each head has a longitudinally tapered passage 23 so that the wall of that passage will ride over and engage the outer tapered faces of the key-bars as those heads are moved toward each other and, by this means, press the key-bars inwardly against the two shaft-ends.

The confronting ends of the two coupling heads are each provided with an annular flange 24, and, by reference to Fig. 6 of the drawings it will be noted that these flanges have a series of cross-wise peripheral grooves 25 and also a series of radial key-way recesses 26 in their vertical confronting faces, both for purposes that will presently be expained.

Figure 2:
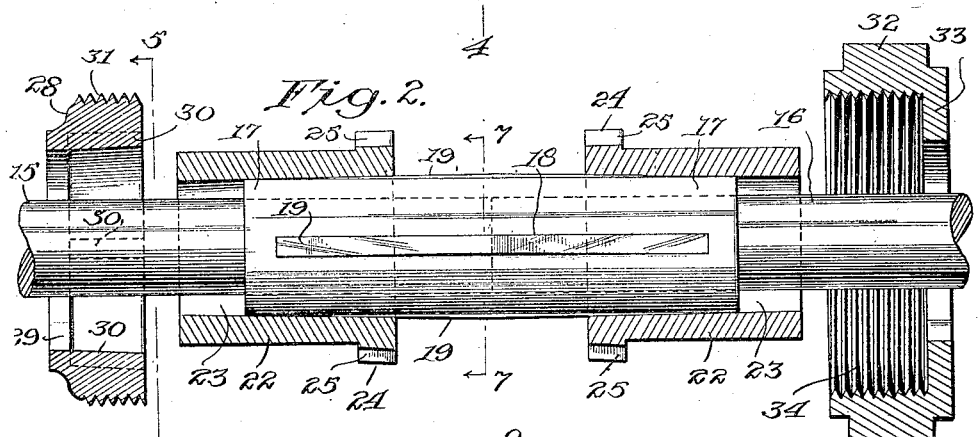
Fig. 2 illustrates the same parts separated but in position for assembly.

After the two coupling heads 22, have been moved toward each other from the position shown in Fig. 2, they will ride up on the inclined surfaces 21 of the key-bars 19 and press the latter inwardly through the slots 18 in the sleeve until their concave faces 20 seat close against the shaft-ends 15 and 16 in which position they will be ready to be clamped together. The drawing-together of these coupling-heads is effected through the aid of a locking collar and a nut, as will presently be described.

Figure 3:
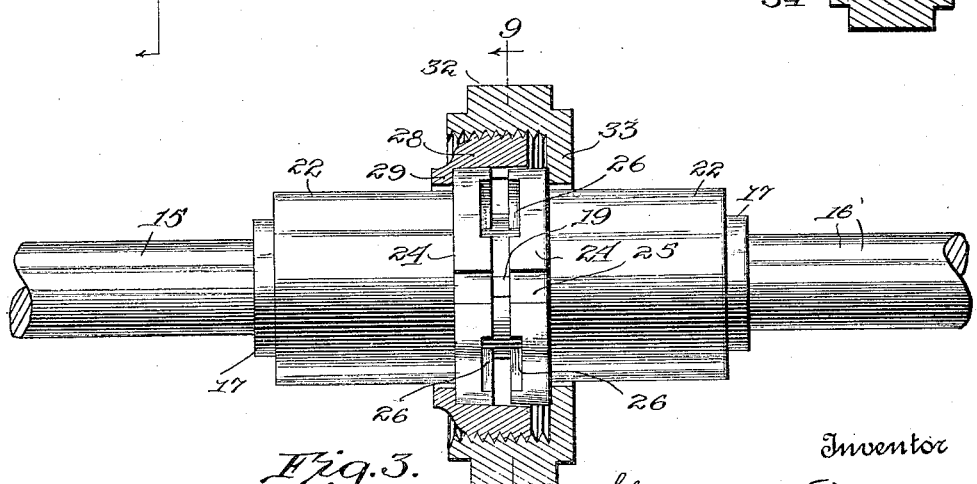
Fig. 3 shows the assembled coupling partly in section and part in side elevation.

By reference to Fig. 3 of the drawings, it will be noted that the two coupling-heads are so disposed with respect to each other that the recesses 26 in the face of one will aline or register with the recesses in the face of the other. This alinement of the radial recesses 26 will also produce an alinement of the crosswise peripheral grooves 25, in the coupling-head flanges 24, also as shown in Fig. 3 of the drawings.

The purpose of these alined recesses and grooves in the two coupling-heads is for the reception of locking devices which will extend from one groove into the other, or from one recess into another, whereby to lock the two heads in a circumferential direction so that independent slip or rotation of one head with respect to the other will be prevented.

In effecting this locking-together, I make use of a plurality of wedge-shaped key-blocks 27 which are shaped to fit the recesses 26 in the heads and these key-blocks are of sufficient thickness to extend from the recess in the face of one coupling-head over and into the registering recess in the face of the other coupling-head so that when the keys are in place in the registering recesses they will lock the two heads against independent rotation.

The two heads 22 are drawn together by means of a locking collar 28 which collar has an interior annular flange 29 at one side and is also provided with a plurality of interior locking lugs 30 which lugs extend along the interior of the collar from the annular flange 29 to the opposite side edge of the collar, as shown in broken lines in Figs. 1 and 2 of the drawings.

The locking lugs 30 on the interior of the collar are so disposed around the inner circumference thereof that they will register with and enter the cross-grooves 25 in the flanges of the coupling-heads and thus lock the collar and said coupling heads against independent rotation.

The locking collar is provided with an exterior circumferential screw-thread 31 for a purpose that will presently be explained.

After the collar 28 has been moved over and onto the one coupling-head until its flange 29, engages the flange 24 of said head, a nut 32, is passed over the other head until an interior annular flange 33 thereof engages the flange 24 of said latter head. This nut has interior screw-threads 34 which engage the exterior threads 31 of the collar so that as the nut is revolved it will draw on the collar and as the two coupling-head flanges are confined between the collar and nut, the drawing together of the latter will effect a drawing-together of the two heads.

Obviously, as the two coupling-heads 22 are drawn together their inner inclined passage walls will depress the locking-bars 19 and force the latter into rigid engagement with shaft-ends so as to lock the shaft-ends and heads together, then the collar and nut securely lock the two heads together and thus make a rigid connection between the coupling and the two shafts.

I claim:

1. In a shaft-coupling the combination with means to circumferentially engage two shaft-ends, of two coupling-heads surrounding said means and each coupling-head being provided with a circumferential projection, a locking-collar engaging the projection on one of said heads, a locking-nut engaging the projection on the other of said heads said collar and nut being also provided with means to engage one with the other and means to lock the collar and the head it engages to prevent rotation of the one with respect to the other.

2. In a shaft-coupling the combination with sleeve means to circumferentially engage two shaft-ends, of two coupling-heads surrounding said means and each coupling-head being provided with a circumferential projection, a locking-collar independent of said heads but engaging the projection on one of said heads, a locking nut also independent of said heads but engaging the projection on the other of said heads said collar and nut also being provided with means to engage one with the other and detachable key-means independent of both heads for locking the two heads against independent rotation said detachable key-means being held in place by the locking-collar.

3. In a shaft-coupling the combination with means to circumferentially engage two shaft-ends, of two coupling-heads surrounding said means and each coupling-head being provided with a circumferential projection, a locking-collar engaging the projection on one of said heads, a locking-nut engaging the projection on the other of said heads said collar and nut being also provided with means to engage one with the other, key-means to lock one head to the other to prevent independent rotation and means for locking the collar to the heads.

4. In a shaft-coupling the combination with two coupling heads each head having a circumferential projection and each circumferential projection being provided with a recess on its end face said heads being arranged about the shaft-ends so that the end-face recess on one head will register with an end-face recess on the other head, a detachable key seated partly in the end-face recess of one head and entering the registering end-face recess in the other head whereby to lock said two heads against independent rotation, a locking-collar engaging the circumferential projection of one head and extending over the end-face recesses in both heads and also over the detachable key therein and a locking-nut engaging the circumferential projection of the other head and also engaging the said locking-collar.

5. In a shaft-coupling the combination with two coupling-heads each head having an annular flange and each flange being provided with a peripheral groove, of a locking-collar engaging one head-flange and provided on its interior with a locking-lug which projects into registering peripheral grooves on the two head-flanges whereby the collar and both head-flanges will be locked against independent rotation, a locking-nut engaging the other head-flange and having means to lock it with the collar and means for engaging the heads with two shaft-ends.

In testimony whereof I affix my signature.

GEORGE M. WINGARD.